UNITED STATES PATENT OFFICE.

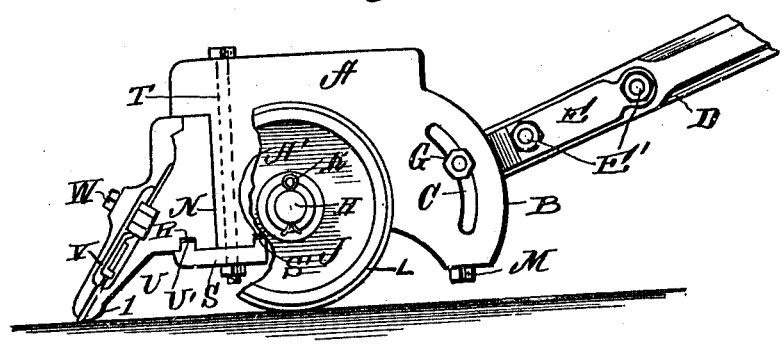
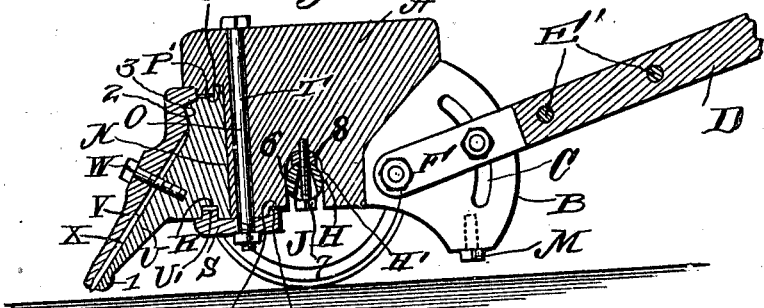
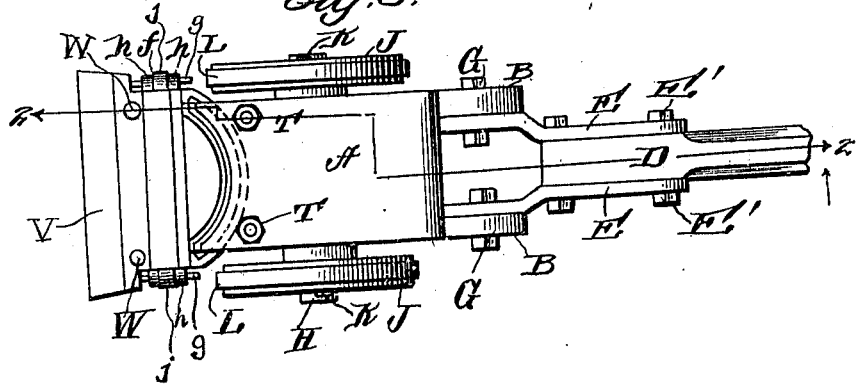

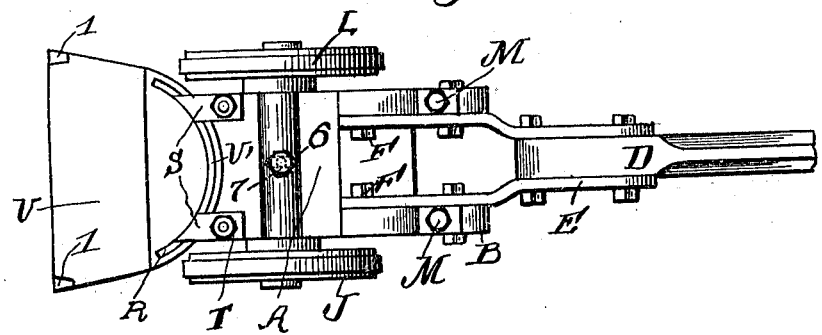

SAMUEL MOWRY AND JOSEPH HURSH, OF MANSFIELD, OHIO.

FLOOR-SCRAPER.

953,098.

Specification of Letters Patent. Patented Mar. 29, 1910.

Application filed July 27, 1908. Serial No. 445,614.

*To all whom it may concern:*

Be it known that we, SAMUEL MOWRY and JOSEPH HURSH, citizens of the United States, residing at Mansfield, in the county of Richland and State of Ohio, have invented certain new and useful Improvements in Floor-Scrapers, of which the following is a specification.

This invention relates to improvements in floor scrapers, and has for its object to generally simplify, improve and increase the efficiency and practicability of devices of this type.

Further the invention aims to provide a novel form of means for mounting the cutter head, and for enabling adjustment of the cutter blade.

Further and other objects will later appear.

In the drawings: Figure 1 is a side elevation of the invention, parts being broken away, Fig. 2, is a vertical sectional view on line 2—2 of Fig. 3, Fig. 3, is a top plan view, Fig. 4, is an underneath plan view, Fig. 5, is a fragmentary sectional view of the cutter head, and Fig. 6, is a detail view, partly in section illustrating the means for adjusting the cutter blade.

The body of the machine is designated A, being formed at its rear with a pair of spaced ears B, each formed with an arc-shaped slot C.

D designates the handle which has a pair of arms E, secured to opposite sides of its lower end, as by means of bolts E'. The inner ends of arms E are offset and are secured by means of bolts F, F, to the ears B, so that the arms may have movement, in an arc-like plane, about said bolts, for the purpose of adjusting the angular position of handle D. Bolts G, provided with nuts, are passed through arms E at their inner ends and through the slots C of arms E, to sustain the arms in any desired adjustment.
Headed plugs of rubber, M, are secured in openings provided therefor in the bottom sides of ears B, to prevent the ears from coming in contact with the floor, or other surface, thereby obviating danger of the latter becoming marred, scratched, or otherwise defaced.

The forward end of body A, is formed with an arc-shaped cut-out portion N, and a groove P, which faces downwardly. The cutter head U is shaped at its rear to be received in said cut-out portion N, and is formed with an upwardly extending rib P', which engages in groove P. The under side of cutter head U, is formed with an arc-shaped groove R, clearly shown in Fig. 4, in which engages the projections U', on a pair of plates S, the latter engaging the under side of cutter head U, and body A. The rear ends of plates S, are formed with projections S', which engage shoulders A', formed by a cutaway portion on the under side of body A. Bolts T having nuts on their ends extend through openings in body A, and plates S, to thereby sustain the body and cutter head in their normal relation shown in the drawings. Cutter head U, is formed on its lower rear end with a pair of lugs 1, rounded on their rear faces and whose function is to engage the floor or other surface and restrict the cut of the cutter blade.

X denotes the cutter blade, preferably having each of its opposite ends beveled so as to be capable of interchangeable use, which seats on the front inclined faces of the cutter head and is clamped thereto by means of a plate V through which screw bolts W, pass into the cutter head U. The upper end of the cutter head on its front face is formed with an angular projection 2, of V-shape which is received in a correspondingly shaped recess 3, formed in clamping plate V. By means of this last described construction the rear end of the clamping plate may be brought to bear with the desired pressure on blade X, by virtue of screw bolts W.

As depicted more clearly in Figs. 3 and 6, of the drawings, cutter head U, is formed at each of its ends with a pair of spaced perforated lugs $h$, a nut $j$, being mounted between said lugs and receiving a threaded rod $g$, which latter passes through the perforations of said lugs $h$, and has its front end bent hook-fashion as at 4, to extend through an opening Y, formed in cutter blade X. Cutter head U is further formed with a perforated lug 5, below the lowermost lug $h$, which receives rod $g$ and serves to guide same and prevent any tendency thereof toward lateral movement.

H denotes the axle on which body A is mounted being received in inverted U-shaped openings H', which extend through the bottom side of said body. Axle H, is formed with an elongated opening 6, extending transverse to the longitudinal axis of the axle, shown by dotted lines Fig. 4. The opening 6 is tapered as seen in Fig. 2, being widest at its base, and through the opening is passed the screw bolt 7, which passes through a washer 8 placed between the body A and axle H, by means of which the axle is secured to the body. Due to the tapered form of opening 6, it will be obvious from Fig. 2, that the axle may have a slight rocking movement with respect to body A, should the wheels J encounter any obstruction. The wheels J are secured to axle H, by means of cotter pins K, and are preferably equipped with rubber treads L.

What is claimed is:

1. A floor scraper including a body having a cut-out portion in its front end and a groove which faces downwardly, a cutter head received in said cut-out portion, a rib on said cutter head engaging in said groove, said cutter head on its under side being formed with a groove, a pair of plates engaging the under side of said body and the under side of said cutter head, projections on said plates which extend into said groove of the cutter head, bolts passing through said head and plates to secure said plates to said body, and a cutter blade carried by said cutter head.

2. A floor scraper including a body formed with a cut-out portion and a groove, a cutter head received in said cut-out portion, a rib on the top side of said cutter head which projects upwardly into said groove, said cutter head on its under side being formed with a groove, a plate engaging the under side of said head and formed with a projection which extends into said groove on the under side of said cutter head, and means to secure said plate to said head.

3. A floor scraper including a body, cutting means carried thereby, said body being formed on its under face with an inverted U-shaped opening, an axle carrying wheels arranged in said opening, said axle being formed with an elongated tapering opening, and a screw bolt passed through said opening and extending into said body.

4. A floor scraper including a body formed with a cut-out portion in its front end and having a groove which leads into said cut-out portion, a cutter head disposed in said cut-out portion and formed with a groove on its under side, said body on its under side being formed with a cut-away portion forming a shoulder, a plate having projections on its ends which engage in said groove of the cutter head and said shoulder of the body and a bolt for securing said plates to said body, said bolts passing through said plate between the ends thereof.

In testimony whereof we affix our signatures, in presence of two witnesses.

SAMUEL MOWRY.
JOSEPH HURSH.

Witnesses:
W. H. BOWERS,
R. W. STEPHENSON.